(12) United States Patent
Hashimoto (10) Patent No.: US 10,797,294 B2
(45) Date of Patent: Oct. 6, 2020

(54) WIRE ROUTING STRUCTURE AND BUSBAR MODULE

(71) Applicant: YAZAKI CORPORATION, Tokyo (JP)

(72) Inventor: Yuki Hashimoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 218 days.

(21) Appl. No.: 16/016,531

(22) Filed: Jun. 22, 2018

(65) Prior Publication Data

US 2019/0027733 A1 Jan. 24, 2019

(30) Foreign Application Priority Data

Jul. 21, 2017 (JP) .................. 2017-141880

(51) Int. Cl.
| | |
|---|---|
| *H01M 2/30* | (2006.01) |
| *H01M 2/20* | (2006.01) |
| *H01M 2/04* | (2006.01) |
| *H01M 2/02* | (2006.01) |
| *H01M 10/48* | (2006.01) |
| *H01M 10/42* | (2006.01) |
| *H01M 2/10* | (2006.01) |

(52) U.S. Cl.
CPC .......... *H01M 2/30* (2013.01); *H01M 2/0277* (2013.01); *H01M 2/0456* (2013.01); *H01M 2/202* (2013.01); *H01M 2/206* (2013.01); *H01M 10/425* (2013.01); *H01M 10/48* (2013.01); *H01M 2/1077* (2013.01); *H01M 10/486* (2013.01); *H01M 2010/4278* (2013.01)

(58) Field of Classification Search
CPC ........ H01M 2/022; H01R 4/28; H01R 25/162
See application file for complete search history.

(56) References Cited

U.S. PATENT DOCUMENTS

| | | | | |
|---|---|---|---|---|
| 5,433,625 | A * | 7/1995 | Tsuji | H01R 12/675 439/397 |
| 2014/0057152 | A1 * | 2/2014 | Furuya | H01M 2/206 429/121 |
| 2014/0308560 | A1 * | 10/2014 | Takishita | H01M 2/206 429/121 |

FOREIGN PATENT DOCUMENTS

| | | |
|---|---|---|
| JP | 2012-248512 A | 12/2012 |
| JP | 2016-100247 A | 5/2016 |

* cited by examiner

*Primary Examiner* — Maria Laios
(74) *Attorney, Agent, or Firm* — Kenealy Vaidya LLP (57) ABSTRACT

A wire routing structure includes a case, a wire routing groove formed in the case, a first wire accommodated in the wire routing groove, a second wire one end of which a connection terminal is attached, and a hinge cover connected to the case via a hinge portion. The hinge cover includes a wire holding portion that holds the second wire. The hinge portion positions in an opposite side of the connection terminal while interposing the first wire between the hinge portion and the connection terminal, and positioned below the second wire.

6 Claims, 9 Drawing Sheets

WIRE ROUTING STRUCTURE AND BUSBAR MODULE

CROSS-REFERENCES TO RELATED APPLICATIONS

This application is based on and claims priority from Japanese Patent Applications No. 2017-141880 filed on Jul. 21, 2017, the entire contents of which are incorporated herein by reference.

BACKGROUND

1. Field of the Invention

The present invention relates to a wire routing structure and a busbar module.

2. Description of Related Art

An assembled battery in which plural cells are connected to each other in series or in parallel is installed for example in electric vehicles or hybrid electric vehicles. According to related art, in a vehicular assembled battery, a positive electrode and a negative electrode of adjacent cells are connected to each other by plural busbars. General electrodes in two ends of the assembled battery are electrically connected to power source terminals (connection terminals) in ends of power lines connected to a load. These busbars and power source terminals are held in a busbar module that is made of an insulative resin and is attached to the assembled battery.

The busbar module is provided with voltage detection terminals that are electrically connected to the electrodes of the cells and temperature sensors that are in contact with the surfaces of the cells, respectively. Each voltage detection terminal has for example a flat-plate-like terminal portion, and is attached so as to be laid on a busbar. Thus, in the busbar module, not only the power lines (electric wires) which are connected to the respective power source terminals but also many detection lines (electric wires) such as voltage detection lines connected to the voltage detection terminals and temperature detection lines connected to the temperature sensors are housed and routed.

However, the busbar module in which the power lines and the large number of detection lines are routed has portions where the power lines and the detection lines cross each other. For example, the power source terminals which are connected to the respective power lines are attached to the respective end electrodes after the detection lines are inserted in the wire routing grooves and hinge covers to cover the respective wire routing grooves are closed. An opening/closing base portion of each hinge cover is connected to a case of the busbar module by a hinge portion and its opening/closing tip portion is locked on the case by a lock claw or the like.

Each power line to whose end the power source terminal is connected is routed so as to cross the wire routing groove and is held by and fixed to a wire holding portion that is provided on the top surface of a hinge cover. Thus, when the power line is lifted up during wire routing work, the hinge cover may be lifted up together with the wire holding portion and the hinge cover may be opened with respect to the case. Then, the detection lines may jump out from the wire routing groove.

PRIOR ART DOCUMENTS

[Patent document 1] JP-A-2012-248512
[Patent document 2] JP-A-2016-100247

SUMMARY

One or more embodiments relate to a routing structure and a busbar module in which opening of a hinge cover which covers a wire routing groove can be controlled even if a wire held on a wire holding portion of the hinge cover is lifted up.

In accordance with one or more embodiments, a wire routing structure includes a case, a wire routing groove formed in the case, a first wire accommodated in the wire routing groove, a second wire one end of which a connection terminal is attached, and a hinge cover connected to the case via a hinge portion. The hinge cover includes a wire holding portion that holds the second wire. The hinge portion positions in an opposite side of the connection terminal while interposing the first wire between the hinge portion and the connection terminal, and positioned below the second wire.

Other aspects and advantages of the invention will be apparent from the following description and the appended claims.

DETAILED DESCRIPTION

Figure 1:
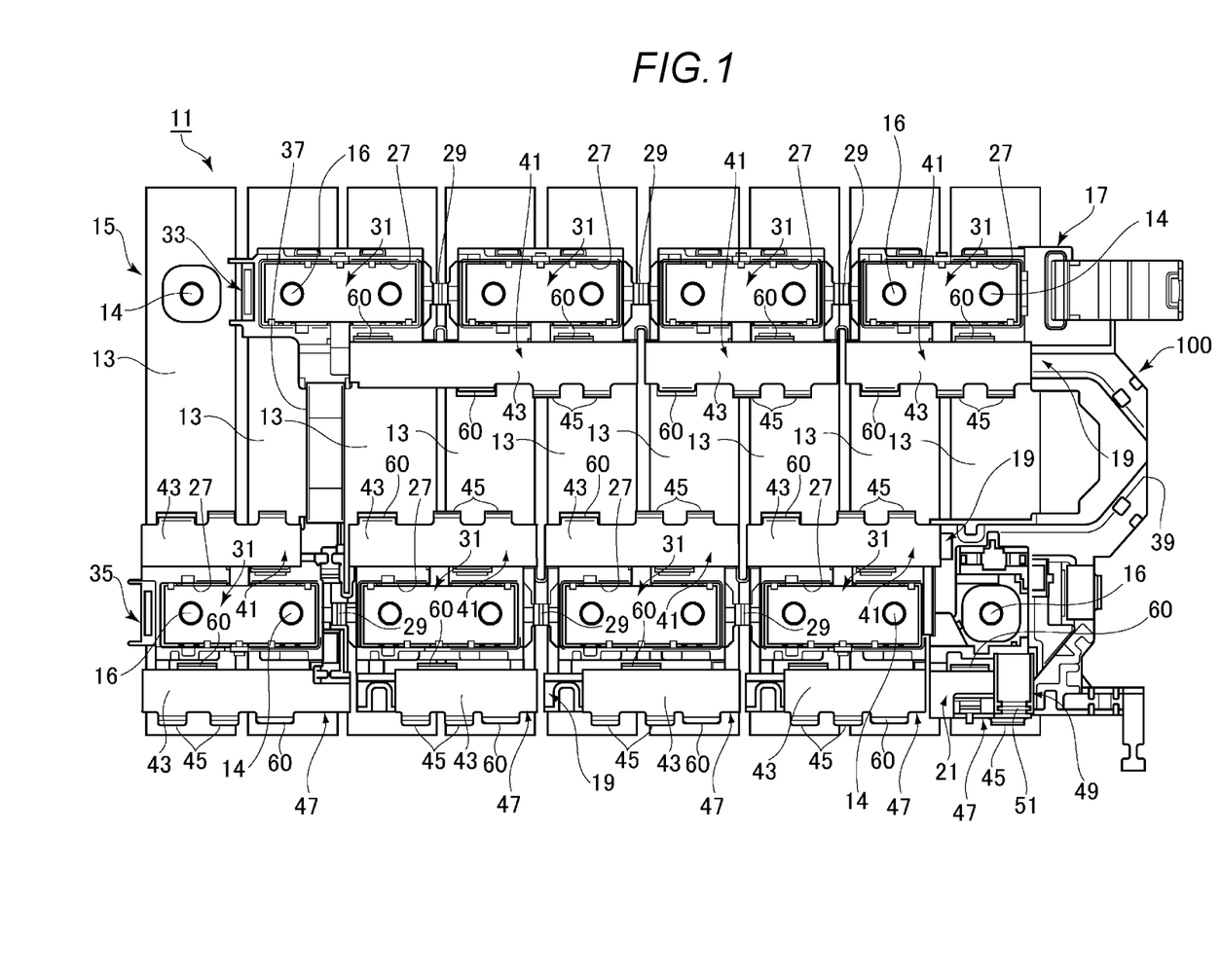
FIG. 1 is a rough plan view of a battery pack which is equipped with a busbar module having a wire routing structure according to an embodiment.

An embodiment will be hereinafter described with reference to the drawings. FIG. 1 is a rough plan view of a battery pack 11 which is equipped with a busbar module 100 having a wire routing structure according to the embodiment.

As shown in FIG. 1, the wire routing structure according to the embodiment would be used suitably for the busbar module 100. The busbar module 100 is attached to an assembled battery 15 in which plural cells 13 are arranged adjacent to each other. The busbar module 100 and the cells 15 constitute the battery pack 11.

In the embodiment, each cell 13 is shaped like a plate and has a positive electrode 14 and a negative electrode 16 at the two respective ends, in the longitudinal direction, of a top surface which is a rectangular surface. Although in the embodiment the positive electrode 14 and the negative electrode 16 are shaped like a bolt, the invention is not limited to this case. The cells 13 constitute the assembled battery 15 in such a manner as to be arranged adjacent to each other with their plate surfaces opposed to each other and to be integrated together.

Figure 2:
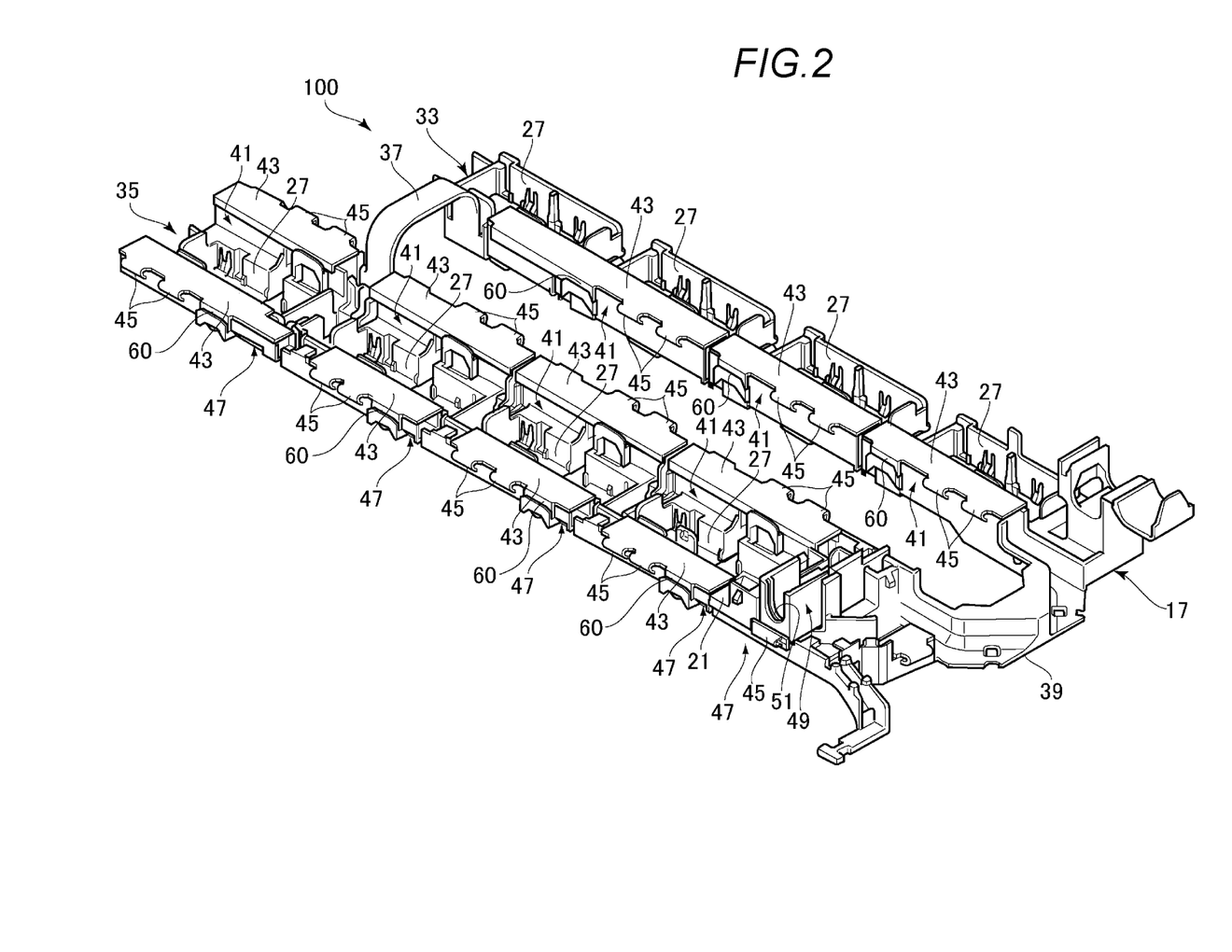
FIG. 2 is a perspective view of an entire busbar module shown in FIG. 1.

FIG. 2 is a perspective view of the entire busbar module 100 shown in FIG. 1. The wire routing structure according to the embodiment has, as main components, a case 17 made of an insulative resin, a wire routing groove 19 (see FIG. 9) which is formed in the case 17, first wires 23 inserted in the wire routing groove 19, a second wire 25 which crosses the first wires 23 over the wire routing groove 19, and a hinge cover 21 (see FIG. 4) which covers the wire routing groove 19.

In the embodiment, the first wires 23 (see FIG. 9) are thin electric wires that are voltage detection lines connected to voltage detection terminals (not shown) and detection lines such as temperature detection lines connected to temperature sensors. The second wire 25 is a thick electric wire as a power line (see FIG. 4) that is larger in diameter than the first wires 23.

The case 17 is a main body of the busbar module 100 and is a unitized mold of an insulative resin material. In the case 17, plural, rectangular-box-shaped busbar housing rooms 27 are connected to each other in the arrangement direction of the cells 13 with allowance absorbing portions 29 interposed between them. A positive electrode 14 and a negative electrode 16 of adjacent cells 13 are arranged in each busbar housing room 27. A busbar 31 which is a conductive metal plate for connecting a positive electrode 14 and a negative electrode 16 is housed in each busbar housing room 27.

Thus, in the busbar module 100 having the wire routing structure according to the embodiment, the case 17 is attached to the assembled battery 15 in which the plural cells 13 are arranged adjacent to each other and is provided with the plural busbars 31 each of which connects adjacent cells 13.

Two rows of busbar housing rooms 27 that are connected to each other in the arrangement direction of the cells 13 are arranged parallel with each other. The two parallel rows of busbar housing rooms 27 are terminal connection portions 33 and 35, respectively. The associated ends, in the longitudinal direction, of the terminal connection portions 33 and 35 are linked to each other by a link portion 37 or 39.

Plural wire routing portions 41 are formed on the sides of the surfaces, opposed to each other, of the terminal connection portions 33 and 35 so as to be arranged parallel with the terminal connection portions 33 and 35. Each wire routing portion 41 has a wire routing groove 19 which extends in the arrangement direction of the cells 13. Each wire routing groove 19 is formed with a rectangular opening at the top, that is, on the side opposite to the cells 13.

The wire routing portions 41 have respective hinge covers 43. Each hinge cover 43 is molded integrally together with the associated wire routing portion 41 via hinge portions 45. Each hinge cover 43 opens and closes the above-mentioned rectangular opening of the associated wire routing groove 19 by being rotated with the hinge portions 45 as rotation supporting points.

Other plural wire routing portions 47 are formed on the side opposite to the wire routing portions 41 with the busbar housing rooms 27 of the terminal connection portion 35 interposed between them so as to be arranged parallel with the terminal connection portion 35. Each wire routing portion 47 has a wire routing groove 19 which extends in the arrangement direction of the cells 13. The wire routing groove 19 is formed with a rectangular opening at the top, that is, on the side opposite to the cells 13.

Like the above-mentioned wire routing portions 41, the wire routing portions 47 have respective hinge covers 43. Each hinge cover 43 is molded integrally together with the associated wire routing portion 47 via hinge portions 45. Each hinge cover 43 opens and closes the rectangular opening of the associated wire routing groove 19 by being rotated with the hinge portions 45 as rotation supporting points.

The first wires 23 are inserted in the wire routing portions 41 and 47.

Figure 3:
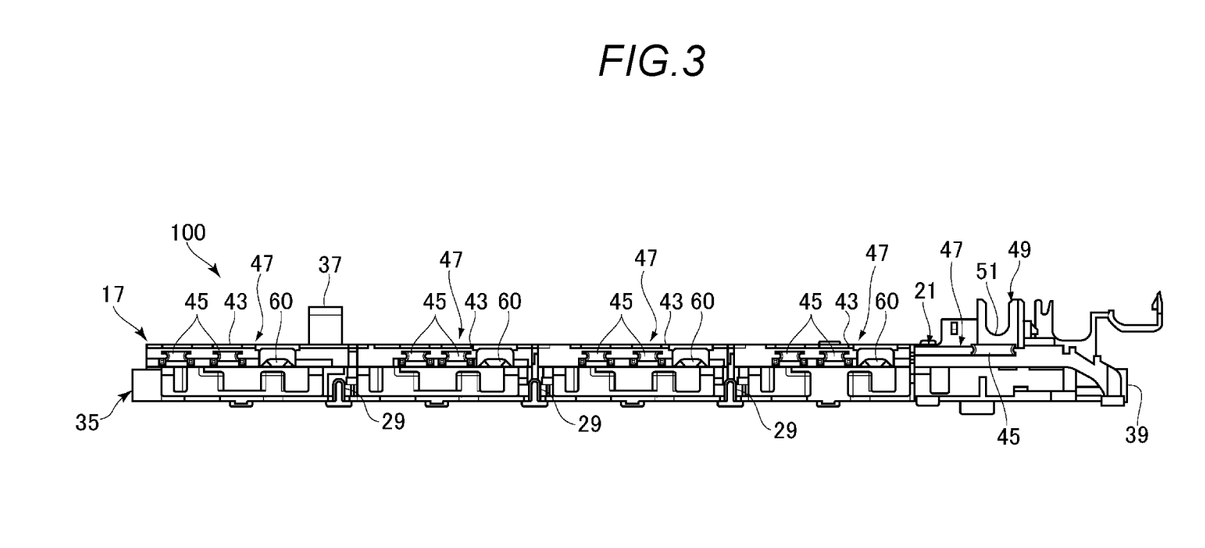
FIG. 3 is a front view of the busbar module shown in FIG. 2.

FIG. 3 is a front view of the busbar module 100 shown in FIG. 2. The wire routing portion 47 that is closest to the link portion 39 is molded integrally together with a wire holding portion 49 via the top surface of the hinge cover 21. A second wire 25 (see FIG. 4) extends over this wire routing portion 47 in a direction that crosses the first wires 23 inserted in the wire routing portion 47. The wire holding portion 49 is formed with a U-shaped groove 51. The groove width of the U-shaped groove 51 is shorter than the diameter of the second wire 25, whereby the second wire 25 can be press-fitted in and held by the U-shaped groove 51.

Figure 4:
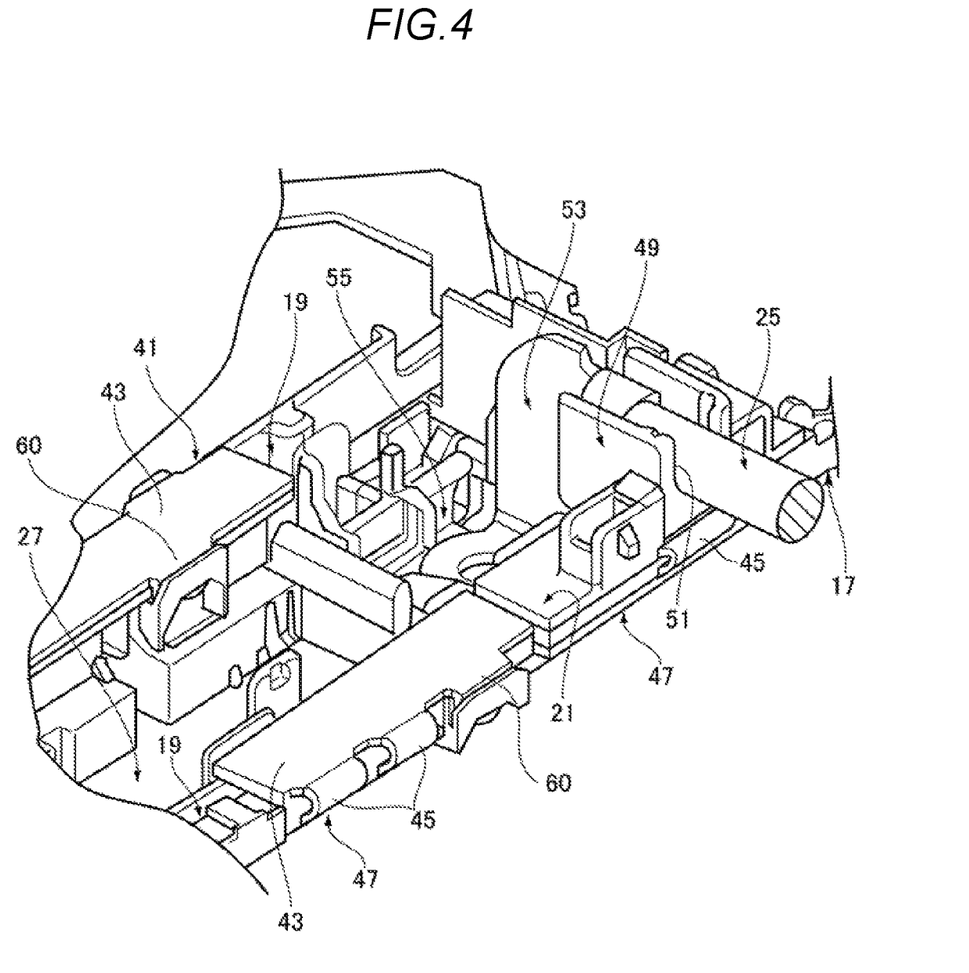
FIG. 4 is an enlarged perspective view of an essential part, that is, a hinge cover and its neighborhood, of the busbar module shown in FIG. 2.

FIG. 4 is an enlarged perspective view of an essential part, that is, the hinge cover 21 and its neighborhood, of the busbar module 100 shown in FIG. 2.

An LA terminal 53 is connected to the end of the second wire 25 and is set in an LA terminal housing portion 55 of the case 17. A bolt (negative terminal 16) which is an end electrode of the assembled battery 15 penetrates through the LA terminal 53 being set in the LA terminal housing portion 55 and is fastened by a nut. A portion close to the end, to which the LA terminal 53 is fixed, of the second wire 25 is press-fitted in the U-shaped groove 51 of the wire holding portion 49 and is thereby fixed.

Figure 5:
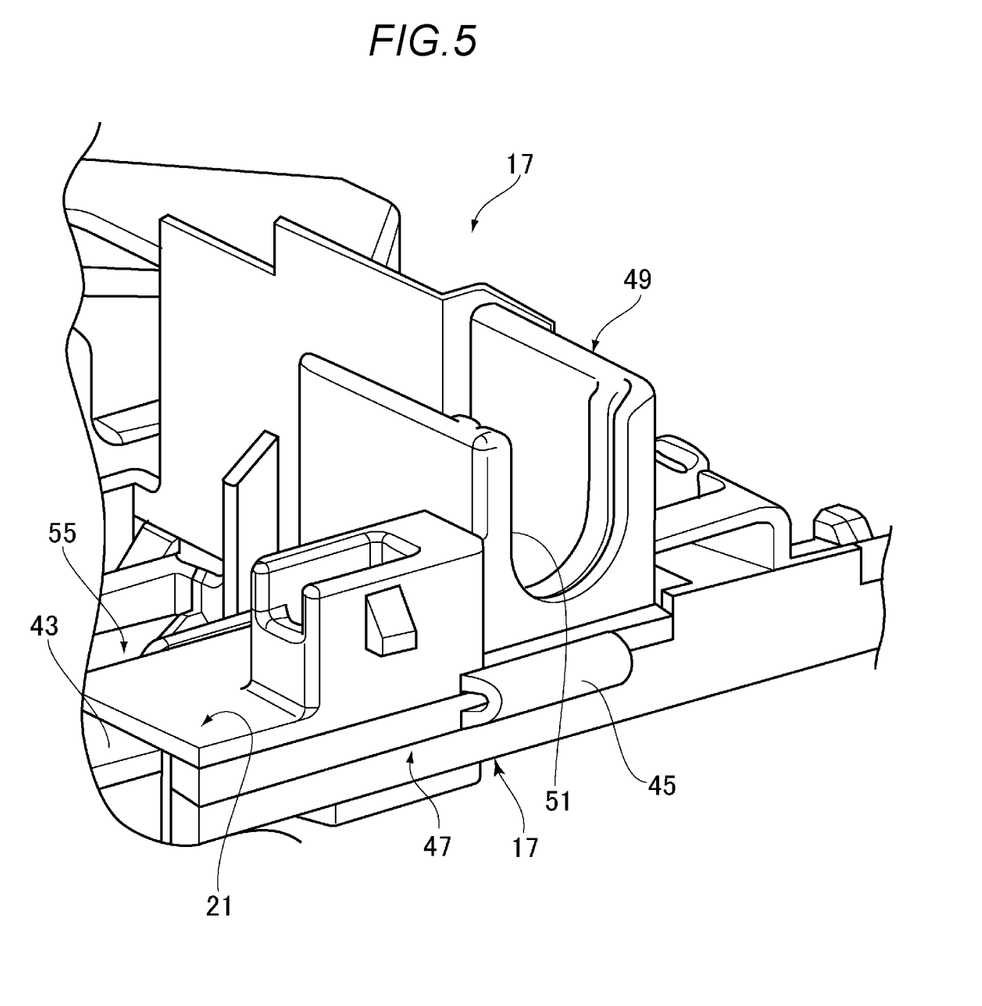
FIG. 5 is an enlarged perspective view of an essential part, that is, the hinge cover and its neighborhood, of the part of the busbar module shown in FIG. 4, with a second wire omitted.

FIG. 5 is an enlarged perspective view of an essential part, that is, the hinge cover 21 and its neighborhood, of the part of the busbar module 100 shown in FIG. 4, with the second wire 25 omitted.

To cover the associated wire routing groove 19, the hinge cover 21 which is formed with the wire holding portion 49 is unitized with the case 17 via a hinge portion 45 on the side opposite to the LA terminal 53 with the first wires 23 interposed between them. Furthermore, the hinge portion 45 is connected to the case 17 under the second wire 25 (e.g., at a position right under the second wire 25 or its vicinity). The hinge portion 45 is a thin hinge that is shaped like a rectangular plate piece so as to be flexible. The hinge portion 45 is molded integrally together with the hinge cover 21 via one of its pair of parallel longer edges, and is molded integrally together with the case 17 via the other of its pair of parallel longer edges.

Figure 6:
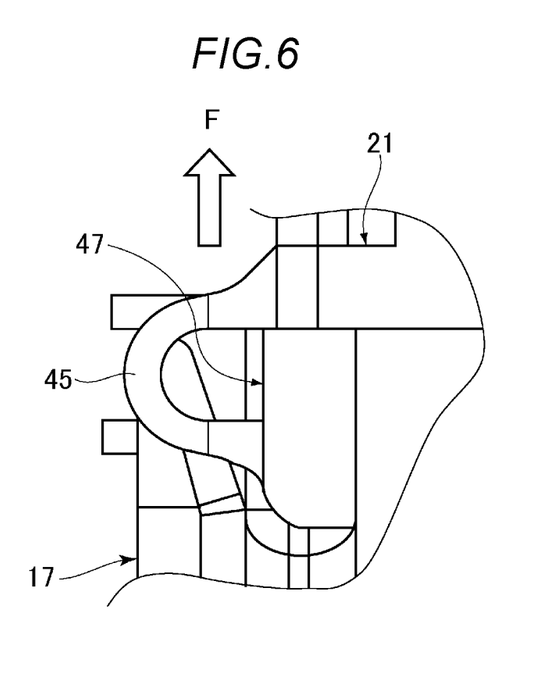
FIG. 6 is an enlarged side view of an essential part of the hinge portion shown in FIG. 5.

FIG. 6 is an enlarged side view of an essential part of the hinge portion 45 shown in FIG. 5. When the wire routing groove 19 is covered with the hinge cover 21, the hinge portion 45 connects the case 17 and the hinge cover 21 while being bent so as to assume a semicircular shape in a side view. The hinge portion 45 is formed with a thickness and a longitudinal extension length that give it such strength that the hinge cover 21 does not lift up from the case 17 with the hinge cover 21 is closed. Furthermore, the hinge cover closing strength of the hinge portion 45 is set so that the hinge cover 21 is not separated from the case 17 even if the second wire 25 which is held by and fixed to the hinge cover 21 is lifted up by an external force F during wire routing work.

Next, workings of the above-configured wire routing structure will be described. Before that, a wire routing structure according to a comparative example will be described.

Figure 7:
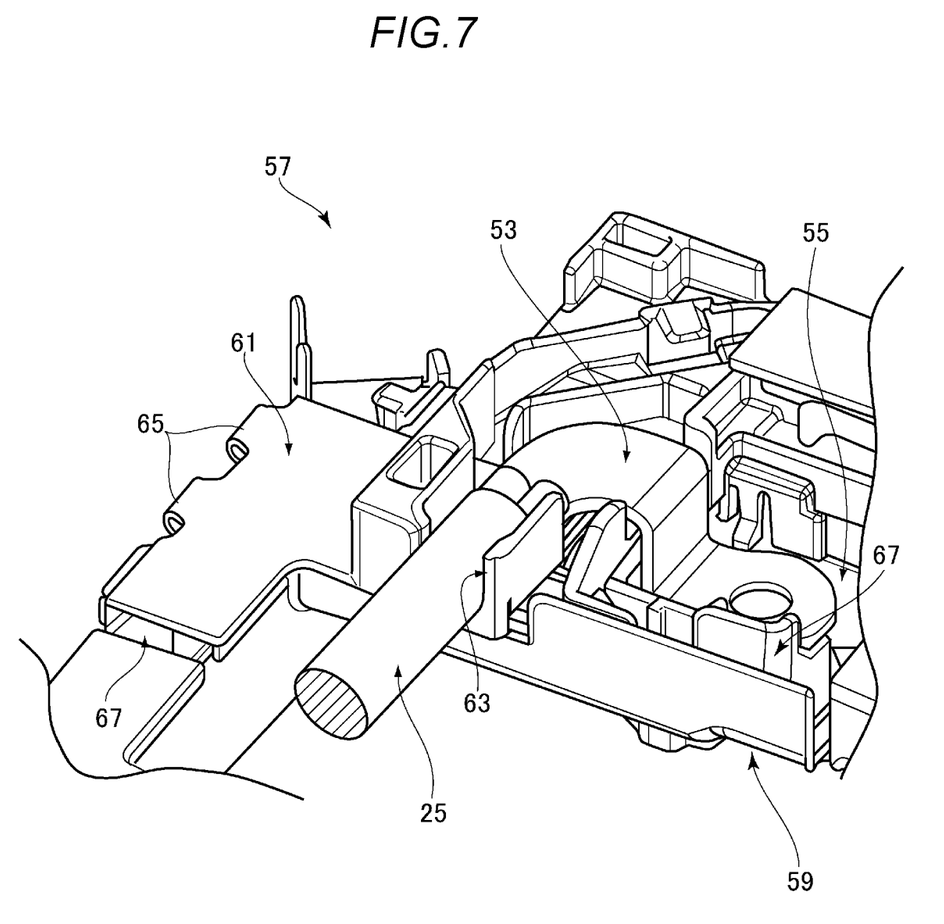
FIG. 7 is an enlarged perspective view of an essential part, that is a hinge cover and its neighborhood, of a busbar module according to a comparative example.
Figure 8:
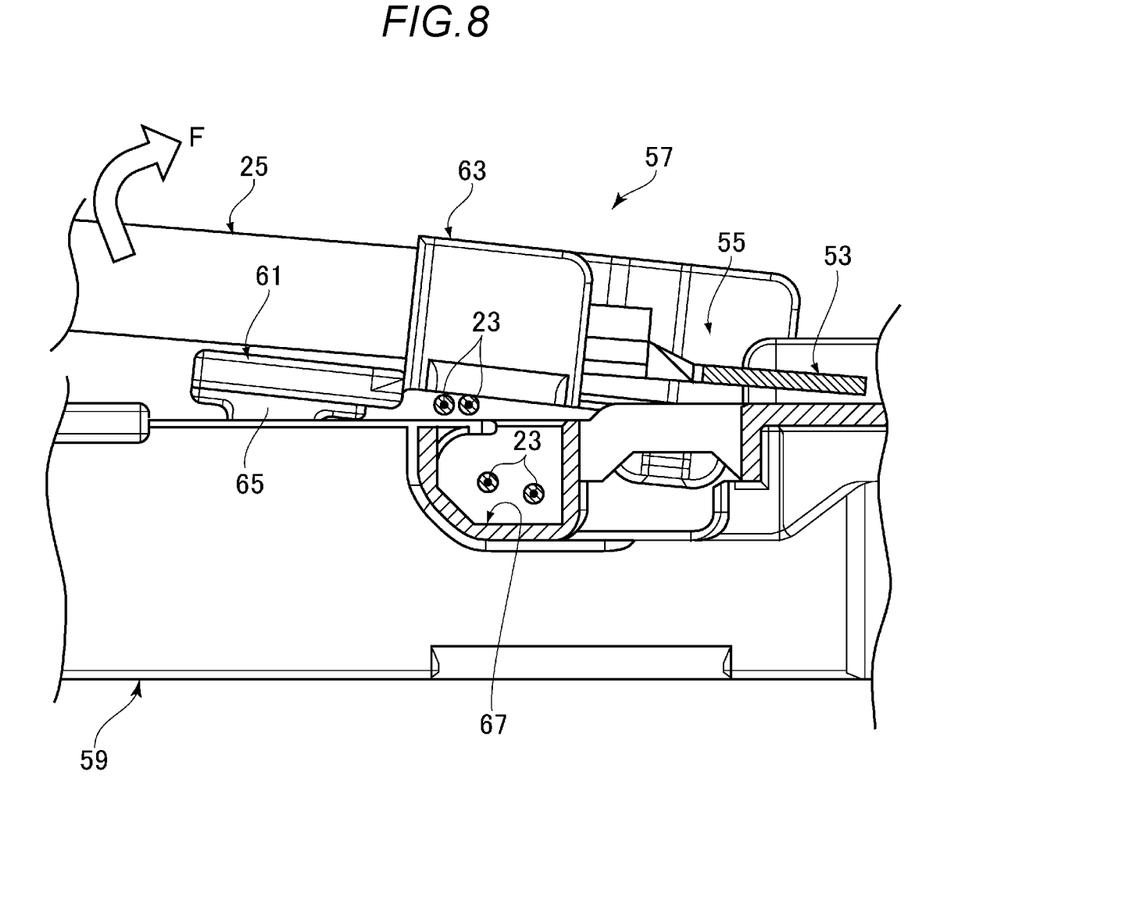
FIG. 8 is a transverse sectional view showing a stat that a second wire of the busbar module according to the comparative example shown in FIG. 7 has been lifted up.

FIG. 7 is an enlarged perspective view of an essential part, that is a hinge cover 61 and its neighborhood, of a busbar module 57 according to the comparative example. FIG. 8 is a transverse sectional view showing a stat that a second wire 25 of the busbar module 57 according to the comparative example shown in FIG. 7 has been lifted up.

As shown in FIG. 7, in the busbar module 57 according to the comparative example, an LA terminal housing portion 55 of a case 59 is unitized with the hinge cover 61. The hinge cover 61 has a wire press-fitting portion 63 for holding the second wire 25. An LA terminal 53 has such a structure that it cannot be attached unless the hinge cover 61 is closed. The structure of the embodiment is the same in this respect. However, in the wire routing structure of the comparative example, the wire press-fitting portion 63 is distant from hinge portions 65.

In the wire routing structure of the comparative example, when the LA terminal 53 is attached, the second wire 25 is press-fitted into the wire press-fitting portion 63. The LA terminal 53 is attached after inserting first wires 23 into a wire routing groove 67 and then closing the hinge cover 61. An opening/closing base portions of the hinge cover 61 is connected to the case 59 by the hinge portions 65 and its opening/closing tip portion is locked on the case 59 by a lock claw or the like. The second wire 25 to whose end the LA terminal 53 is connected is held by and fixed to the wire press-fitting portion 63 which is provided on the top surface of the hinge cover 61. Thus, when the second wire 25 is lifted up during wire routing work, as shown in FIG. 8 there may occur an event that the hinge cover 61 is lifted up together with the wire press-fitting portion 63 by an external force F and opened with respect to the case 59. When the hinge cover 61 is opened, first wires 23 may jump out of the wire routing groove 67.

Figure 9:
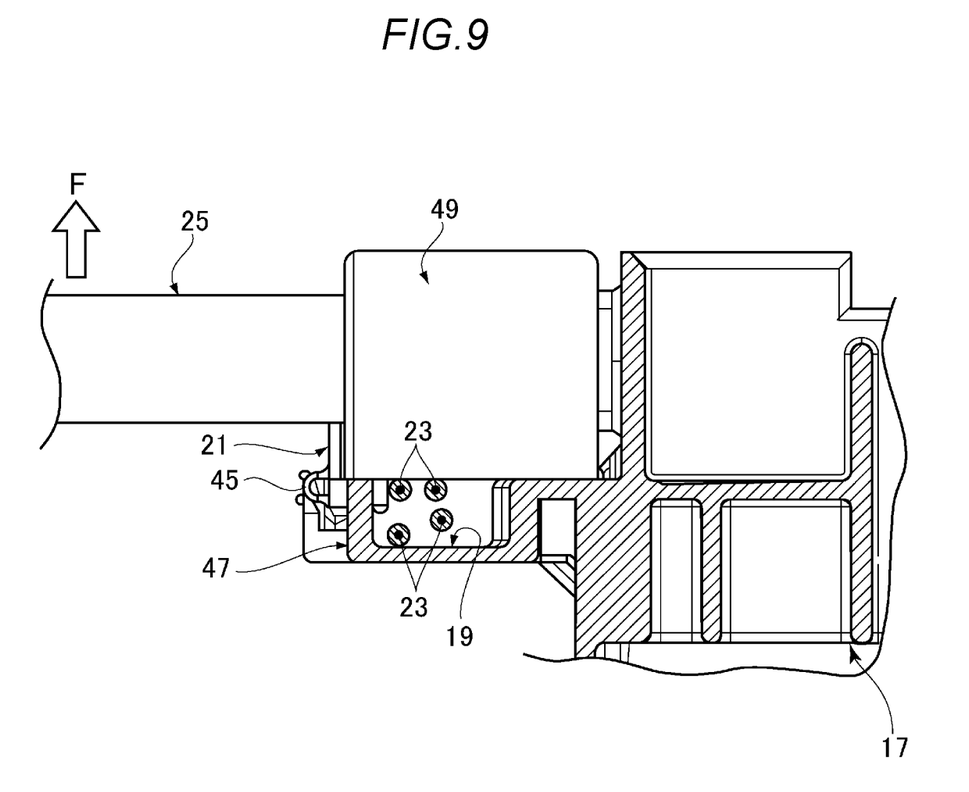
FIG. 9 is a transverse sectional view showing a state that a lift-up force has acted on the second wire of the busbar module according to the embodiment shown in FIG. 4.

FIG. 9 is a transverse sectional view showing a state that a lift-up force has acted on the second wire 25 of the busbar module 100 according to the embodiment shown in FIG. 4.

In the wire routing structure according to the embodiment, after the first wires 23 have been routed, the wire routing groove 19 is covered with the hinge cover 21. The hinge cover 21 is closed by being rotated with the hinge portion 45 (which connects the hinge cover 21 and the case 17) as the rotation supporting point. That is, an opening/closing base portion of the hinge cover 21 is supported by the hinge portion 45 and its opening/closing tip portion is locked on the case 17 by a lock claw 60 (see FIG. 1). The second wire 25 to whose end the LA terminal 53 (which is attached to and fixed to the end electrode (negative terminal 16)) is connected is set over the hinge cover 21 so as to extend in the direction that crosses the first wires 23. The second wire 25 is held by and fixed to the wire holding portion 49 which is formed on the top surface of the hinge cover 21.

When a portion, opposite to the LA terminal 53 which has been attached and fixed, of the second wire 25 which is fixed to the case 17 via the hinge cover 21 is lifted up by an external force F in such a direction as to go away from the case 17 during, for example, wire routing work, a lift-up force also acts on the hinge cover 21 via the wire holding portion 49. At this time, since the portion, opposite to the LA terminal 53 with the first wires 23 interposed between them, of the hinge cover 21 is unitized with the case 17 via the hinge portion 45 under the second wire 25, a lift of the hinge cover 21 is prevented by the hinge portion 45.

This holding ability corresponds to the tensile strength of the hinge portion 45. In this manner, an event is prevented that a gap is formed by separation of the hinge cover 21 from the case 17. As a result, the first wires 23 are prevented from jumping out of the wire routing groove 19 which has been covered with the hinge cover 21.

In the wire routing structure according to the embodiment, in particular, a profound effect is obtained because the first wires 23 are thin electric wires and the second wire 25 is a thick electric wire. Where the second wire 25 is a thick electric wire which is hard to bend, when a portion, opposite to the LA terminal 53, of the second wire 25 is lifted up away from the case 17 during wire routing work, a strong force acts on the hinge cover 21. On the other hand, where the first wires 23 are thin electric wires such as detection lines, first wires 23 may jump out of the wire routing grove 19 through even a slight gap. According to the wire routing structure of the embodiment, the tensile strength of the hinge portion 45 can bear a force that acts on the hinge cover 21 when the second wire 25 which is a thick electric wire is lifted up. As a result, the first wires 23 which are thin electric wires can be prevented from jumping out by preventing opening of the hinge cover 21 reliably even when a strong external force is exerted from the second wire 25 which is a thick electric wire.

According to the busbar module 100 of the embodiment, the first wires 23 which are detection wires can be prevented from jumping out of the wire routing grove 19 when the second wire 25 which is a power line is lifted up, merely by changing the position of the hinge portion 45 of the hinge cover 21 which is molded integrally together with the case 17, that is, without the need for adding a separate component or a dedicated functional portion.

As described above, according to the wire routing structure of the embodiment, opening of the hinge cover 21 can be prevented even when the second wire 25 is lifted up which is fixed to the wire holding portion 49 of the hinge cover 21 which covers the wire routing grove 19.

The busbar module 100 according to the embodiment makes it possible to provide a highly reliable busbar module in which the first wires 23 are prevented from jumping out, at a low cost without the need for adding a separate component or a dedicated functional portion.

The invention is not limited to the above embodiment. Modifications made of those skilled in the art based on the disclosure of this specification and known techniques are within anticipations of the invention and should be included within a scope of the invention.

Although in the above embodiment, the wire routing structure is applied to the case 17 of the busbar module 100. However, the invention is applicable for any structures in which a first wire crosses a second wire, and a hinge cover that covers a wire routing groove in which the first wire is accommodated is provided with a wire holding portion for holding the second wire.

According to the embodiment and modifications of the embodiment, a wire routing structure includes: a case 17 made of an insulative resin; a wire routing groove 19 which is formed in the case 17; a first wire 23 inserted in the wire routing groove 19; a second wire 25 which crosses the first wire 23 over the wire routing groove 19 and to one end of which a connection terminal (LA terminal 53) is attached; and a hinge cover 21 a top surface of which is provided with a wire holding portion 49 on which the second wire 25 is held. The hinge cover 21 positions in an opposite side of the connection terminal (LA terminal 53). The first wires 23 is interposed between the hinge cover 21 and the connection terminal 53. The hinge cover 21 is formed integrally with the case 17 and positions below the second wire 25.

According to the structure, after the first wire has been routed, the wire routing groove is covered with the hinge cover. The hinge cover is closed by being rotated about the hinge portion (which connects the hinge cover and the case) as the rotation supporting point. That is, an opening/closing base portion of the hinge cover is supported by the hinge portion and its opening/closing tip portion is locked on the case by a lock claw or the like. The second wire is set over the hinge cover so as to extend in a direction that crosses the first wires. The second wire is held on the wire holding portion which is formed on the top surface of the hinge cover.

When a portion of the second wire is lifted up in such a direction as to go away from the case during wire routing work, a lift-up force acts on the hinge cover via the wire holding portion. At this time, since the portion of the hinge cover is integrated with the case via the hinge portion under the second wire, a lift of the hinge cover is prevented by the hinge portion. As a result, the first wire are prevented from jumping out from the wire routing groove which has been covered with the hinge cover.

In the wire routing structure, the first wire 23 may be a thin electric wire, and that the second wire 25 may be a thick wire that is lager in diameter than the thin electric wire.

According to the structure, the first wire is the thin electric wire and the second wire is a thick electric wire. Since the second wire is a thick electric wire which is hard to bend, when a portion, opposite to the connection terminal, of the second wire is lifted up away from the case during wire routing work, a strong force acts on the hinge cover. On the other hand, since the first wire is the thin electric wire, a first wire may jump out from the wire routing grove through even a slight gap. However, according to the wire routing structure of this configuration, the tensile strength of the hinge portion would bear a force that acts on the hinge cover when the second wire which is the thick electric wire is lifted up. As a result, the first wire which is the thin electric wire would be prevented from jumping out by preventing opening of the hinge cover reliably even when a strong external force is exerted from the second wire which is a thick electric wire.

According to the embodiment and modifications thereof, a busbar module 100 includes the above wire routing structure. The thin electric wire is a detection line. The thick electric wire is a power line. The case 17 is attached to an assembled battery 15 in which plural cells 13 are arranged adjacent to each other. The case 17 is provided with plural busbars 31 each of which connects electrodes (positive electrode 14 and negative electrode 16) of adjacent ones of the cells 13.

According to the structure, the first wire which is detection wire is from jumping out of the wire routing grove when the second wire which is a power line is lifted up, by arranging the hinge portion of the hinge cover which is molded integrally with the case.

According to the wire routing structure of the embodiment and the modifications thereof, opening of the hinge cover would be prevented even when the second wire is lifted up which is fixed to the wire holding portion of the hinge cover which covers the wire routing grove.

The busbar module according to the embodiment and the modifications makes it possible to provide a highly reliable busbar module in which the first wires are prevented from jumping out, at a low cost without adding a separate component or a dedicated functional portion.

DESCRIPTION OF SYMBOLS

13 . . . Cell
14 . . . Positive electrode (electrode)
15 . . . Assembled battery
16 . . . Negative electrode (electrode)
17 . . . Case
19 . . . Wire routing groove
21 . . . Hinge cover
23 . . . First wire
25 . . . Second wire
31 . . . Busbar
45 . . . Hinge portion
49 . . . Wire holding portion
53 . . . LA terminal (connection terminal)
100 . . . Busbar module

What is claimed is:

1. A wire routing structure comprising:
    a case made of an insulative resin;
    a wire routing groove which is formed in the case;
    a first wire accommodated in the wire routing groove;
    a second wire which crosses the first wires over the wire routing groove and to one end of which a connection terminal is attached; and
    a hinge cover that is integrally formed with the case, is connected to the case via a hinge portion, and covers the wire routing groove,
    wherein the hinge cover includes a wire holding portion that is provided on a top surface of the hinge cover and holds the second wire, and
    wherein the hinge portion positions in an opposite side of the connection terminal while interposing the first wire between the hinge portion and the connection terminal, and positioned below the second wire, such that the hinge portion is underneath and overlapped with the second wire.

2. The wire routing structure according to claim 1, wherein the first wire is a
    thin electric wire, and
    wherein the second wire is a thick electric wire that is lager in diameter than the thin electric wire.

3. A busbar module comprising the wire routing structure according to claim 2, wherein that the thin electric wire is a detection line,
    wherein the thick electric wire is a power line,
    wherein the case is attached to an assembled battery including a plurality cells, and
    wherein a plurality of busbars are accommodated in the case, wherein each of the plurality of busbars connects electrodes of adjacent ones of the plurality of cells to each other.

4. The wire routing structure according to claim 1, wherein
    the hinge portion crosses with the second wire.

5. The wire routing structure according to claim 1, wherein
    the hinge portion and the first wire extend in a first direction, and
    the second wire extends in a second direction, the second direction being different than the first direction.

6. The wire routing structure according to claim 1, wherein
the first wire runs perpendicular to the second wire.

\* \* \* \* \*